Sept. 29, 1970　　　　　J. J. GRADY　　　　　3,531,269
MOLTEN STEEL SLAG HANDLING PROCESS AND APPARATUS
Filed April 21, 1967　　　　　　　　　　　　　　2 Sheets-Sheet 2
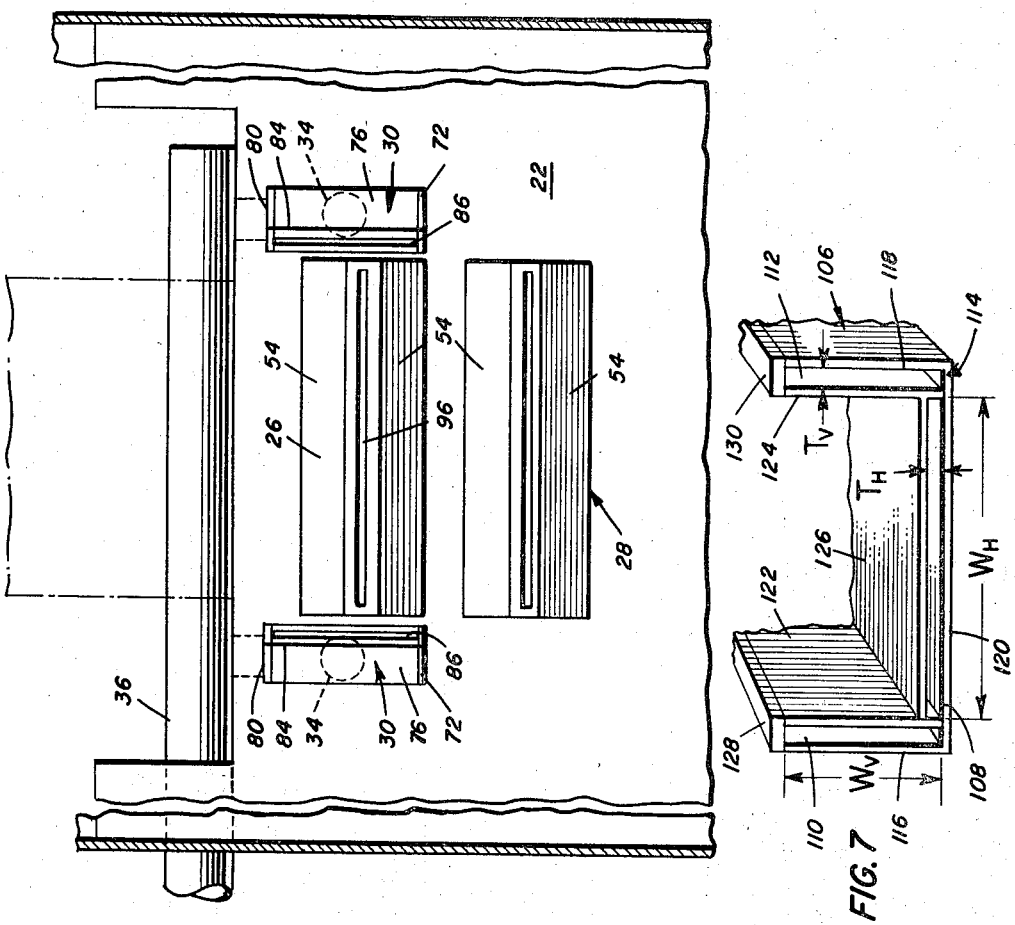
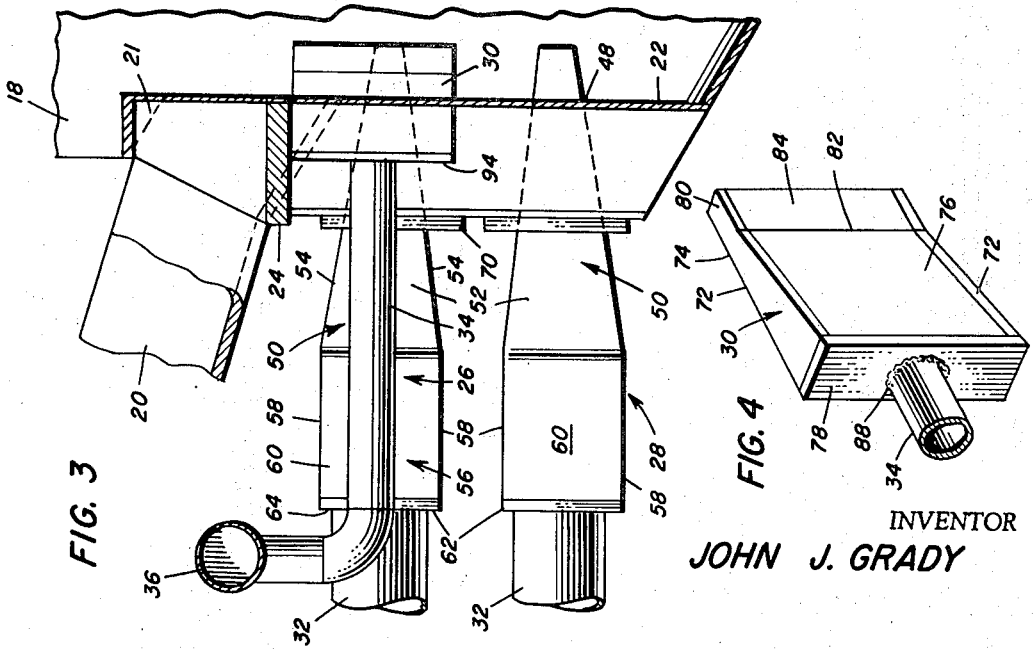
INVENTOR
JOHN J. GRADY
BY
Le Blanc & Shur
ATTORNEY

United States Patent Office 3,531,269
Patented Sept. 29, 1970

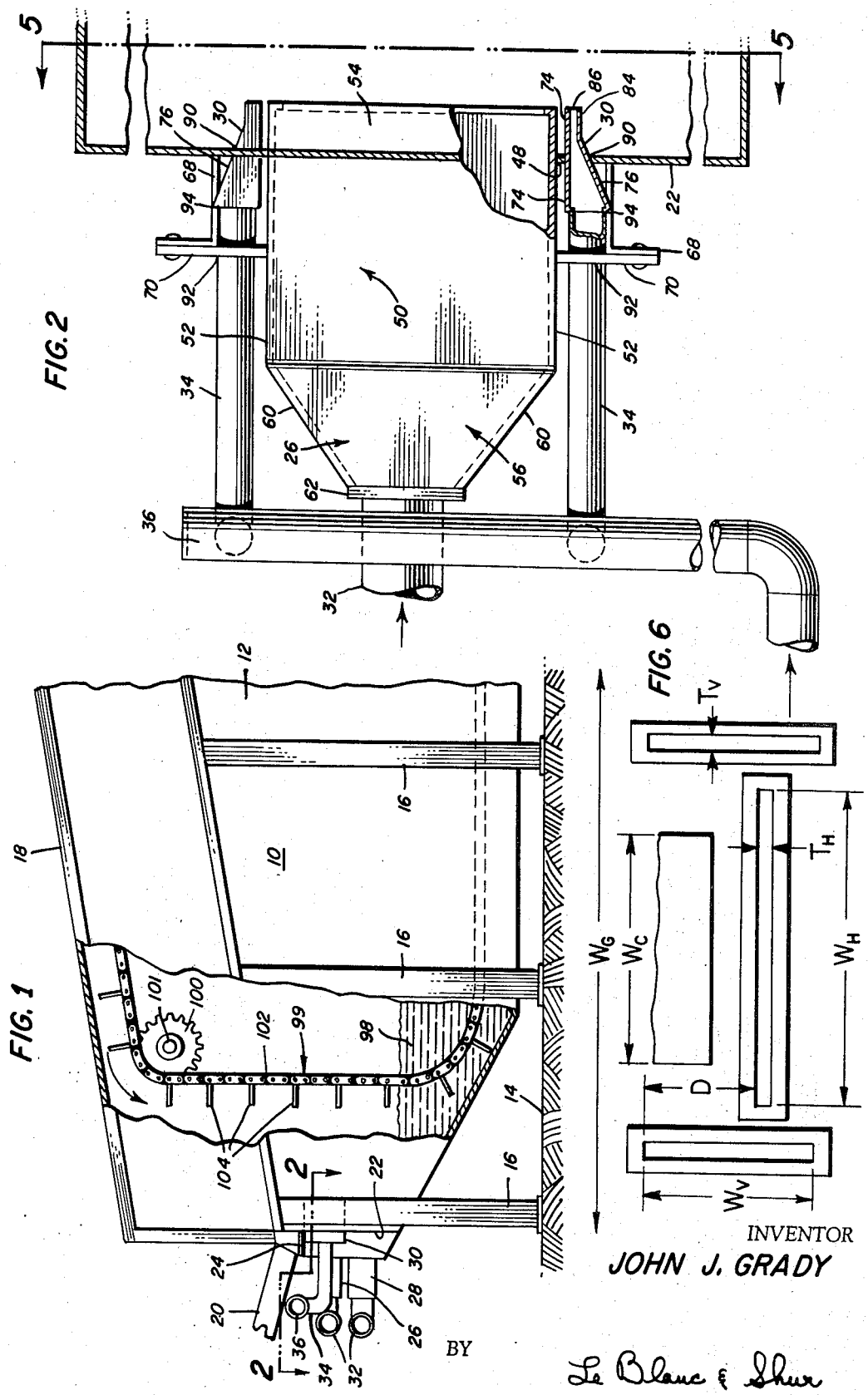

3,531,269
MOLTEN STEEL SLAG HANDLING PROCESS
AND APPARATUS
John J. Grady, New Florence, Pa., assignor to International Steel Slag Corporation, Washington, D.C., a corporation of the District of Columbia
Continuation-in-part of application Ser. No. 428,519, Jan. 27, 1965, which is a continuation-in-part of application Ser. No. 126,792, June 28, 1961. This application Apr. 21, 1967, Ser. No. 632,825
The portion of the term of the patent subsequent to Apr. 25, 1984, has been disclaimed
Int. Cl. C03b 5/18, 19/08
U.S. Cl. 65—19
22 Claims

ABSTRACT OF THE DISCLOSURE

An improved system is described for processing and disposing of molten steel slag produced during the steel making process. The system includes a steel slag granulator including a receptacle and nozzle means for injecting into the granulator one or more jet streams of water in the form of a trough of water. The nozzle means has a horizontally extended bottom portion and vertical side portions for injecting the trough of water which intercepts molten slag poured into the receptacle to rapidly cool and granulate the slag prior to disposal.

This application is a continuation-in-part of my copending application Ser. No. 428,519, filed Jan. 27, 1965, and now U.S. Patent 3,316,075, entitled "Steel Slag Handling System" which is in turn a continuation-in-part of my earlier application Ser. No. 126,792, filed June 28, 1961, and now abandoned. To the extent that they are pertinent, the disclosures of applications Ser. No. 126,792 and Ser. No. 428,519 are incorporated by reference in the present application.

THE INVENTION

The present invention relates to a system for efficient, fast and economical handling of slag discharge from a steel making furnace, and more particularly to improved granulation apparatus for processing molten slag from a steel making furnace by converting the slag to a granular mixture of slag and metal particles of relatively small size and low temperature. Apparatus in accordance with the present invention is of special significance for its utilization of novel and improved water injection means which provides greater control of the molten slag input in relation to the water granulation jets especially at high tonnage rates of molten slag input.

As discussed in my parent application, Ser. No. 428,519, the efficient, rapid removal of large quantities of slag from steel making furnaces and out of the furnace building is a long-standing major problem in the manufacture of steel whether by open hearth furnaces or by oxygen steel making furnaces, sometimes called "OSM" or "BOF" furnaces. The problems of handling and removing steel slag have been seriously increased by the rapid adoption of "OSM" or "BOF" furnaces within the past few years. These furnaces are capable of producing steel in large quantities in short heat times. For example, one steel company in the United States has produced about 240 tons of steel in 27 minutes, tap-to-tap, compared to 6–8 hours in a modern open hearth furnace. However, such oxygen steel furnaces also form large quantities of slag, e.g., on the order of 12–16% of the heat tonnage. Thus, an OSM or BOF furnace producing about 200–250 tons of steel in 30–60 minutes will also produce about 35 tons of molten slag in 30–60 minutes. These vast quantities of molten slag must be rapidly removed from the furnace and the furnace building without interruption or delay in the actual steel making operations and at reasonable cost.

As described in detail in my parent application Ser. No. 428,519, it has been a longstanding common practice to discharge steel furnace slag into cast iron slag pots removable from the furnace building on rail cars. However, this slag pot system has proved inadequate and unsatisfactory for removal of large tonnages of steel slag, particularly for OSM or BOF and open hearth furnaces of increased capacity and decreased melt time. Thus, some leading steel plants have adopted a system of discharging the open hearth slag into the pit of the open hearth shop, and thereafter removing it from the furnace building by means of high lift tractors and heavy duty trucks. In the case of OSM of BOF furnaces, the prevailing method of handling and removing molten slag continues to be by use of a large number of costly slag pots, moved by cranes and/or railcars from the furnace to a relatively remote slag dump. As amplified in my parent applications such present multi-step batch methods of handling OSM and open hearth steel slags are not only costly from the viewpoint of slag handling but also have serious inherent shortcomings limiting useful capacity of the furnaces. Improvement on prevailing methods to handle and dispose of increasing steel slag tonnages, especially for OSM or BOF in much less time, has become essential to minimize and avoid production delays; and that has been and is a matter of serious concern to the U.S. steel industry.

The invention described in applications Ser. No. 428,519 and Ser. No. 126,792 (hereafter called my "parent cases") is directed to a system which provides a new improved steel slag removal system that departs from the slag material handling concepts of current and earlier systems as described above, thereby avoiding numerous difficulties and making it possible to achieve continuous removal of slag from the furnace building with no delay in the steel making process. Briefly, the system of my parent cases comprises improved slag handling apparatus whereby the red hot molten slag from the steel furnace is discharged into a "granulator" in which it is suddenly cooled and granulated by jets of water to form relatively small discrete particles of granulated slag and metallics which are removed from the granulator and transported by continuous conveyor means to a suitable storage or disposal facility. The result is complete and continuous granulation and removal of slag even under conditions of maximum rate of slag discharge, without any interruption of the steel making operation of the furnace. Hence, the improved slag handling system of my parent cases eliminates removal delays which prevent optimum use of improved oxygen techniques and shorter heat times with large capacity furnaces. My new system also achieves other important objects and advantages as discussed in my parent application.

Among the features contributing to the success of my improved slag granulation system are the particular configuration of the nozzles employed for injecting the jets of water for granulation of the slag and also the relationship between such nozzles and the slag chute or other means employed for discharging the molten slag into the granulator to provide optimum action with the high speed water jets on the slag. In this regard, the system of my parent cases comprises at least one horizontal nozzle, preferably having a substantially rectangular elongated aperture to provide a relatively thin, wide, flat jet of water which is intercepted from above, at a suitable angle, by the stream of molten slag flowing from an appropriate slag chute which preferably has straight sides at the discharge end. The dimensions of the nozzle and the slag chute employed are selected to insure substantially complete interception of the stream of molten slag with the jets of water, whereby rapid cooling and granulation is achieved.

As previously stated, the steel slag granulation system of my parent cases provides a solution of many long-standing problems of great concern to the steel making industry whereby safe, rapid, and efficient steel slag granulation removal and disposal has become a reality.

However, conditions sometimes arise where it is necessary to modify the slag granulation arrangements of my parent cases. For example, as previously noted, it is preferable that the molten slag be discharged into the granulator through a trough having elongated substantially parallel sides so that the slag poured into the granulator has a trajectory in the direction of the longitudinal axis of the nozzles and water jets injected from the same into the granulator. For certain installations, however, e.g., where the sides of the slag input chute are slanted outwardly from the chute axis for various reasons, portion of the stream of molten steel slag discharged into the granulator sometimes possess velocity transverse to the axis of the water jets injected into the granulator. This can result in incomplete interception of the molten steel slag and the substantially flat water jets for granulating the slag, whereby quantities of molten slag may fall into the granulator bath below the jets without having been subjected to the granulating action and cooling effect of the water jets. Similar results may be encountered for turbulent slag flow at high rates of molten slag input or for some particular slag compositions.

Discharge of molten slag directly into the water bath of the granulator intercepting the water jets above the water bath is undesirable and renders the system less efficient and sometimes produces objectionable and unsatisfactory operating conditions. It also results in non-uniform granulation of the steel slag, which produces a wide diversity of slag particle sizes making it difficult to efficiently transport hydraulically from the granulator or to efficiently separate metallics, with standard magnetic separation equipment.

Non-uniform granulated slag particles are especially undesirable when the removal of granulated slag from the granulator is accomplished by a so-called hydraulic transport system such as that described in detail in my copending application Ser. No. 535,743, filed Mar. 17, 1966 and now U.S. Pat. 3,337,517 entitled "Steel Slag Handling Apparatus." Such a hydraulic transport system provides slag removal by pumping the slag from a tank associated with the granulator in the form of a slag-water slurry. Excessively large slag particles are preferably not passed through the pump and conduit system, and separation of large oversize particles before pumping might be necessary or desirable. In any event, incomplete slag granulation with a large percentage of oversize slag particles so separated, result in an inefficient hydraulic system and require larger and more costly facilities.

The present invention, therefore, is specifically directed to overcoming the above-described difficulties in an economical but completely effective manner.

Briefly, in accordance with the present invention, there is provided a steel slag granulating apparatus similar in construction to the system of my parent cases, comprising an elongated granulator tank including a slag input chute, and two vertically spaced horizontal nozzles disposed in the tank wall at the input end. The nozzles are adapted to produce wide, thin water jets positioned to intercept the stream of molten slag as it is discharged into the granulator from the slag chute. Cooperating with the above are two additional water nozzles disposed vertically in the granulator end wall adjacent to the upper one of the horizontal slag granulating water jet nozzles and arranged to produce thin, vertical jets of water similar to those produced by the horizontal granulating nozzles.

The horizontal and vertical nozzles are so positioned relative to each other that they cooperate to produce an upper water jet having a generally U-shaped or H-shaped cross section, which produces, in effect, a trough of flowing water into which the molten slag is discharged by the slag chute. Alternatively, the upper horizontal and two vertical nozzles may be replaced by a unitary nozzle structure for producing the water stream of the desired U-shaped cross section. Below is a discussion of specified ranges of nozzle dimensions and water input conditions which are found to produce practicable and optimum results in practice.

Accordingly, it is a general object of the present invention to provide a modification of my improved steel slag granulating system to eliminate difficulties which can be encountered when the stream of molten slag is injected into the granulator with substantial velocity components transverse to the overall direction of slag flow. It is a further object to provide means for reducing problems of control of a slag trajectory transverse to the trajectory of the horizontal water jet(s) to assure interception for effective granulation by the jet stream(s) above the water bath in the granulator.

It is a further object of this invention to provide a modification of my basic steel slag granulating system which minimizes non-uniform granulation of molten steel slag due to turbulent slag flow into the granulator at high slag input rates and/or due to the geometry of the slag discharge chute through which the molten slag is injected into the granulator.

It is a further general object of this invention to provide an improved water jet injection arrangement for the steel slag granulating system of my parent cases.

It is a further specific object of this invention to provide an improved water injection system to eliminate non-uniform slag granulation which will adversely affect either hydraulic transport of the granulated slag from the granulator or magnetic separation of ferrous materials from the granulated slag.

It is also an object of this invention to provide an improved water injection system including an improved nozzle configuration adapted to produce a trough-shaped high velocity water jet for intercepting the molten slag as it is discharged into the granulator. It is a related object to provide an improved water injection system comprising at least one horizontal injection nozzle and a pair of vertical injection nozzles positioned adjacent the horizontal nozzle to produce a stream of water having a generally U-shaped or H-shaped configuration to assure intercepting the entire stream of molten slag injected into the granulator when such stream possesses velocity components transverse to the overall direction of flow, even at high rate of slag input in tons per minute.

The exact nature of the present nivention as well as additional objects and advantages thereof will become clear from consideration of the following specification, claims and appended drawings wherein:

FIG. 1 is a side elevaiton, partially broken away to show internal details of the inlet end of a steel slag granulating system according to my parent cases and also incorporating the improved features in accordance with the present invention;

FIG. 2 is an enlarged, partially sectional view of the nozzle assembly taken along line 2—2 in FIG. 1.

FIG. 3 is an enlarged, partially sectional view of the nozzle assembly shown in FIG. 1;

FIG. 4 is a perspective view of one of the vertical side nozzles according to this invention;

FIG. 5 is a vertical sectional view taken along the line 5—5 in FIG. 2 showing the configuration of the water injection nozzles in accordance with the present invention;

FIG. 6 is a schematic view of a portion of FIG. 5 showing certain structural requirements for a suitable system according to this invention, and FIG. 7 is a fragmentary schematic drawing of a modified nozzle configuration in accordance with this invention.

Referring first to FIG. 1, there is shown a side elevation of a portion of my improved slag granulating apparatus showing certain details pertinent to the present discussion. Other portions, omitted for purposes of clarity, are described in detail in my parent application Ser. No. 428,519.

The granulator, a portion of which is shown at 10, includes a boat shaped tank 12 formed of a plurality of metal plates welded or otherwise secured together to form a water tight receptacle. Granulator 10 is supported on a suitable surface 14, for example, a floor of the steel making shop, or the yard between shop buildings, by series of upright legs 16 secured in any convenient manner to the sidewalls of the granulator tank 12.

Receptacle 12 may be of open topped construction, but is preferably provided with a hood 18 secured to the tank in any desired fashion to prevent the emission of steam into the atmosphere around the granulator. By way of example, hood 18 may be formed of a series of rigid metal plates secured together as by welding and supported by means such as angle members (not shown) to insure structural rigidity. (See my application on "Steel Slag Handling System," Ser. No. 551,168, filed on May 18, 1966, and now U.S. Pat. 3,316,079 as a continuation of my application Ser. No. 304,932, filed Aug. 27, 1963 and now abandoned.)

Molten slag is discharged into granulator 10 from a sloping slag chute 20, the discharge end of which projects into the interior of receptacle 12 through an opening 21 in the rear wall 22 of the receptacle. Chute 20 is intended to represent any suitable slag discharge means and may comprise one or more slag runners connecting granulator 10 directly with the steel making furnace as disclosed in parent application Ser. No. 428,519, and in my additional copending application Ser. No. 551,168 referred to above, alternately chute 20 may have an enlarged section into which the molten slag may be poured from slag ladles transported between the steel making furnace and the granulator location by crane or other suitable means. Chute 20 is supported at the mouth of the granulator 10 in any convenient fashion, e.g., on a ledge 24 of appropriate configuration projecting outwardly from granulator end wall 22.

Projecting into granulator receptacle 12 through end wall 22 are a pair of vertically spaced primary nozzles 26 and 28 and a pair of vertical side nozzles 30 disposed at the ends of upper primary nozzle 26. Nozzles 26 and 28 are connected by like inlet pipes 32 to conventional pumps for providing granulating and cooling water under suitable pressure in the proper quantity and velocity as explained more fully below. Similarly, vertical side nozzles 30 are connected by like inlet pipes 34 and a common supply conduit 36 to the water supply.

The construction of side nozzles 30 and the relationship thereof to primary nozzles 26 and 28 are shown in FIGS. 2–5. With reference to FIGS. 2 and 3, upper nozzles 26 projects through like apertures 48 in granulator end wall 22. Nozzles 26 and 28 each comprise a discharge portion 50 having a pair of parallel trapezoidal side plates 52 and a pair of rectangular top and bottom plates 54 welded or otherwise secured to side plates 50 to produce the tapered configuration shown.

Nozzles 26 and 28 further include flared portions 56 comprises of pairs of parallel trapezoidal top and bottom plates 58, and rectangular side plates 60 welded or otherwise secured together, and to discharge portions 50.

End plates 62 are of generally rectangular configuration and are welded to the respective top and bottom plates 58 and side plates 60. Inlet conduits 32, comprising sections of conventional metal pipe, are welded in openings 64 in the respective nozzle end plates 62 to provide a water-tight connection between the conduits and the nozzles. While the above construction is preferred, it should be understood that other constructions may be suitable if the conditions set forth below as to dimension and water output are met.

Upper and lower nozzles 26 and 28 are mounted by suitable means such as a pair of rearwardly depending angle members 68 secured to granulator end wall 22, and by pairs of mounting lugs 70 secured to each of nozzles 26 and 28, as by welding to the nozzle side walls 52. Mounting lugs 70 are bolted or otherwise attached to angle members 68 in any convenient manner.

In FIG. 4, there is shown a suitable construction for side nozzles 30. Like primary horizontal nozzles 26 and 28, the vertical side nozzles 30 are preferably formed of a plurality of appropriately shaped metal plates, welded together to form the desired nozzle configuration. For the embodiment shown in FIG. 4, the nozzle comprises a pair of identical top and bottom plates 72, a generally rectangular side plate 74, a bent rectangular side plate 76, and a rectangular end plate 78. Top and bottom plates 72 are of generally right triangular configuration, modified to include a narrow rectangular end portion 80 at the discharge end of the nozzle. Nozzle side plate 74 is attached to the longer of the straight sides of top and bottom plates 72 while end plate 78 is attached to the shorter of the straight sides, as shown in FIG. 4.

The second side plate 76, is bent at 82 to conform to the modified end portions 80 and is attached to top and bottom plates 72, opposite side plate 74. As shown in FIG. 2, the narrow spacing between side plate 74 and the parallel portion 84 of side plate 76 forms the discharge opening 86 for side nozzles 30. Inlet pipe 34 is welded or otherwise secured in an aperture 88 in end plate 78 to provide the water to be discharged through the nozzle.

Nozzles 30 are mounted in suitable apertures 90 in granulator end wall 22, as shown in FIGS. 2 and 3, and may be supported in any convenient fashion. By way of example, inlet pipes 34 are supported in apertures 92 cut in mounting lugs 70 and in appropriately shaped notches 94 in the side of angle members 68.

FIG. 5 shows the relationship between side nozzles 30 and upper granulating nozzle 26. As illustrated, the streams of water issuing from discharge openings 86 in vertical side nozzles 30 and the corresponding opening 96 in top horizontal nozzle 26 produce a stream of generally U-shaped configuration whereby molten steel slag discharged from chute 20 falls into a trough of water having a generally horizontal bottom portion (produced by opening 96) and two vertical generally parallel side portions (produced by openings 86). Thus, should the stream of slag possess significant velocity components transverse of its trajectory longitudinally of the chute, the laterally spreading portions of the molten slag stream will thereby be deflected so as to fall through the intercepting horizontal water jet produced by nozzle 26 and lower water jet from nozzle 28. Some of the slag with lateral trajectory intercepting the vertical jet streams produced by vertical nozzles 30 may also be subjected to cooling and granulating by the side jets.

In regard to the above, it should be recognized that the designation "generally U-shaped" is intended to encompass both cross sections actually of U-shaped and also similar cross sections such as the H-shaped section established by nozzles 30 and 26 as shown in FIG. 5. As will be appreciated, the significant feature is the relatively wide trough-shaped water jet having a bottom and vertical sides which is produced by the particular cross sectional nozzle arrangement.

The cooled and granulated slag passing through the water jets from nozzles 26 and 28, and sometimes 30 also, falls into a bath of water 98 wherein the granulated slag particles are further cooled. As explained in my parent applications, the level of water bath 98 should be maintained below the jet streams so that the incoming molten slag intercepts the granulating water jets in atmosphere above the level of the bath. This may be achieved in any convenient manner as by an appropriately located weir or overflow pipe (not shown) to remove excess water supplied by nozzles 26, 28, and 30, as amplified in my parent ases.

Granulator 10 is also provided with an endless scraper or rake-type flight conveyor generally indicated in FIG. 1 at 99. Conveyor 99 is driven in the direction shown by means such as a plurality of toothed sprockets 100 mounted on a shaft 101, driven by suitable means such as an electric motor. Conveyor 99 is comprised of a plurality of transversely spaced endless link belt chains 102 and a series of generally rectangular metal plates or flights 104. Rake flights 104 carry the granulated slag particles to the discharge end of granulator 10 (not shown) from which the granulated slag is discharged into hydraulic transport or other suitable slag removal means. The detailed nature of the slag removal means is set out in my above-mentioned parent applications, incorporated herein by reference, and therefore need not be repeated here.

As in the system of my parent cases, several design and operational factors are relevant in achieving optimum utilization of the improved steel slag granulating system employing the above-described horizontal plus vertical side granulating nozzles. Among these factors are the quantity of molten steel slag being discharged into the granulator, the size, shape, and location of the granulator nozzles, and the velocity and total quantity of water provided by the nozzles relative to the slag input rate.

By way of example, with regard to FIGS. 5 and 6, a granulator constructed in accordance with this invention may have a total width $W_G$ of approximately 5½–6½ feet with an overall length of 30 feet or more. Upper and lower granulating nozzles 26 and 28 are of substantially similar construction with a discharge opening in the form of a narrow, rectangular slit having a horizontal width $W_H$ of about 14 inches and a vertical thickness $T_H$ of approximately ⅜ inch. The width $W_C$ of slag discharge chute 20 is preferably somewhat less than the width $W_H$ of the nozzles 26 and 28; a value of $W_C$ of less than or equal to approximately $0.9W_H$ will generally be satisfactory.

Vertical side nozzles 30 are preferably positioned as close as practical to horizontal granulating nozzle 26. The discharge openings of side nozzles 30 are preferably in the form of narrow, rectangular slits as in the case of horizontal nozzles 26 and 28. The nozzle thickness $T_V$ is preferably equal to the thickness $T_H$ of the horizontal nozzles, i.e., approximately ⅜ inch in the example illustrated. The width $W_V$ of nozzles 30 is preferably substantially in excess of the thickness $T_V$, and in practice, may be somewhat smaller than the corresponding dimension $W_H$ of horizontal nozzles 26 and 28. For example, a value of $W_V$ of approximately 8 inches yields satisfactory results.

The depth D of the trough produced by the combined effects of horizontal nozzle 26 and side nozzles 30 is preferably somewhat less than the height $W_V$ of the side nozzles but should be sufficient to assure interception of all molten slag flowing transversely of the horizontal water jet streams. For example, a value of D of approximately 5 inches is quite satisfactory for a side nozzle width $W_V$ of approximately 8 inches.

With regard to the relationship between the slag input rate and the velocity and quantity of water injected by nozzles 26, 28, and 30, it has been found that the steel slag granulation system of the present invention should preferably be operated according to certain conditions as follows:

(1) In particular, normal steel making operations involve granulation of molten steel slag at rates varying from less than about 2 tons per minute up to as high as about 8 tons per minute. Under such circumstances, granulating water should be supplied through appropriately sized horizontal granulator nozzles 26 and/or 28 in such quantity that jet velocity in feet per second and the flow in gallons per minute varies in relation to the rate at which the molten steel slag is discharged. A suitable relationship between varying rates of slag input and the velocity and flow of granulating and cooling water through a single nozzle is given in Table I below.

TABLE I.—MINIMUM WATER REQUIREMENTS FOR GRANULATION NOZZLES 26 AND 28

| Slag input (tons/min.) | Minimum water jet velocity (f.p.s.) | Minimum quantity (g.p.m) |
|---|---|---|
| Up to 2 | 25 | 400 |
| 2–4 | 30–36.5 | 500–600 |
| 4–7 | 73–110 | 1,200–1,800 |
| 7–8 | 110–122 | 1,800–2,000 |

The velocities given in Table I are based on injection of the entire stated minimum water quantity through a single horizontal nozzle, i.e., upper nozzle 26. If both horizontal nozzles 26 and 28 are employed, the specified flow may be provided by the combined use of both nozzles. In that case, the jet velocities will be 36.5–55 f.p.s. for slag input of between 4 to 7 tons per minute, and 55–61 f.p.s. for slag input of 7 to 8 tons per minute. However, the velocities for slag inputs of up to four tons per minute preferably should be at least those given in Table I, whether using one or two granulating nozzles.

(2) For satisfactory operation, the total water introduced into granulator 10 through all water inlets is preferably at least about 400 gallons of water per minute per ton of steel slag per minute discharged into the granulator. Preferably, however, water should be introduced at a higher rate, e.g., about 900 to 1350 gallons of water per minute per ton of steel slag per minute discharged into the granulator. In fact, most satisfactory results, in terms of minimum vaporization of granulating and cooling water is obtained by injection of at least about 1350 to 1600 gallons of water per minute per ton of steel slag discharged per minute. The input water should preferably be at typical water main temperature, (e.g., 60°–70° F.). Furnace cooling water or other plant used water may be employed, but its temperature preferably should not exceed about 100° F. Water of even higher temperature may be employed, if steam control means such as disclosed in my parent case Ser. No. 428,519 and in another copending application Ser. No. 629,755, filed Apr. 10, 1967, as a continuation-in-part of Ser. No. 428,519, is employed to remove the substantial quantities of steam which may be evolved.

(3) In my basic system, it is found that best results are obtained by introducing all of the water requirements as set out in paragraphs (1) and (2) above, into the granulator through horizontal granulating nozzles 26 and 28. In accordance with the present invention, however, it has been found that a substantial quantity of the water required may be injected through the vertical side nozzles as long as the requirements set forth in paragraph (1) above are satisfied for primary horizontal nozzles 26 and 28. Thus, all water required by paragraph (2) in excess of that required by paragraph (1) may be supplied through side nozzle 30. However, it is still more desirable that the principal water source for the granulator receptacles be the primary horizontal nozzles 26 and 28. Accordingly, it is preferred that at least about 60%, e.g., approximately 70%, of the total water supplied to the granulators be equally divided between the primary horizontal nozzles 26 and 28, with the remaining quantity being equally divided between vertical side nozzles 30, providing the requirements of paragraph (1) above are met.

(4) In light of the foregoing, good results can be achieved for granulator operation in which the minimum water flow and jet velocity in the various nozzles depends upon the rate of molten slag input to the granulator in accordance with Table II below:

TABLE II.—WATER REQUIREMENTS FOR GOOD RESULTS NOZZLES 26, 28, AND 30

| Slag input (tons/min.) | Horizontal nozzles 26 and 28 | | Vertical nozzles 30 | |
|---|---|---|---|---|
| | Velocity (f.p.s.) | Flow (g.p.m.) | Velocity (f.p.s.) | Flow (g.p.m.) |
| Up to 2 | 25–42 | 420–700 | 19.2–32 | 180–300 |
| 2–4 | 42–84 | 700–1,400 | 32–64 | 300–600 |
| 4–7 | 65.5–105 | 1,100–1,750 | 48–80 | 450–750 |

(5) By way of example, the following conditions are representative of suitable operation of an OSM steel slag granulating system in accordance with this invention, under typical conditions: A total quantity of as much as 37.5 tons of molten OSM steel slag may be discharged into the granulator system over a period of approximately 10–11 minutes; there may be significant variation in the sought-for average 3.5 tons per minute rate for slag poured into the granulator due to practical difficulty in getting a precisely controlled pour. Under such conditions, water is provided to the granulator at the rate of approximately 3500–4000 gallons per minute. Of this, approximately 2800 gallons per minute is provided by the horizontal nozzles 26 and 28 with approximately 1400 g.p.m. injected through each nozzle at a velocity of about 84 f.p.s. The remainder, i.e., approximately 1200 g.p.m. is equally divided between vertical nozzles 30, and is injected at a velocity of about 64 f.p.s.

Operation of the granulator in accordance with the foregoing has been found to yield good results in OSM steel slag granulation even when the stream of molten slag has a substantial transverse velocity component.

Alternatively, however, the side nozzle construction described above in connection with FIGS. 2–6 may be modified, if desired, in the manner shown in FIG. 7. As illustrated, a composite nozzle 106 is substituted for vertical side nozzles 30 and upper horizontal nozzle 26. Nozzle 106 is of generally U-shaped configuration and provides a horizontally elongated discharge orifice 108 and a pair of vertically elongated discharge orifices 110 and 112.

The orifice portions of nozzle 106 may be constructed of a plurality of flat metal plates bent and/or welded to the desired configuration. Such a nozzle 106 includes an outer member 114 comprising a pair of vertical segments 116 and 118 and a horizontal segment 120. These provide the outer wall of orifices 110 and 112 and the lower wall of orifice 108. The inner wall of orifice 110 is defined by a vertical plate 122 welded or otherwise secured to segment 120 in parallel relation to segment 116. Similarly, the inner wall of orifice 112 is defined by a metal plate 124 secured to segment 120 in parallel relation to segment 118. A horizontal plate 126 secured to vertical plates 122 and 124 provides the upper wall of orifice 108 as shown. The upper wall of orifice 112 is defined by a plate 128 while the upper wall of orifice 112 is defined by a plate 130.

As illustrated, modified nozzle 106 provides three separate jet streams as in the case of nozzles 26 and 30, rather than the continuous U-shaped stream which would result if the portions of side plates 122 and 124 extending below plate 126 were omitted. The particular constructions used should avoid cavitation or other turbulence such as might result from sharp rectangular corners of a continuous U-shaped orifice. A continuous U-shaped orifice should have a radius at the corners sufficiently large to prevent cavitation or swirling. In any event, the required velocities and flow rates set forth above are maintained in both the horizontal and vertical portions of the stream.

In this regard, the dimensions of horizontal orifice 108, and of vertical orifices 110 and 112 are preferably identical to those of the corresponding horizontal nozzles 26 and 28 and vertical nozzles 30. Thus, for the embodiment described above, orifice 108 is preferably of a width $W_H$ of approximately 14 inches and of a thickness $T_H$ of ⅜ inch. Similarly, the width $W_V$ of orifices 110 and 112 is preferably about 8 inches while the thickness $T_V$ is preferably about ⅜ inch. As will be understood, the operating conditions, i.e., jet velocity and quantity of water flow set forth above in paragraphs (1)–(5), should be met for the modified nozzle 106 (or for the discussed alternative modification employing a continuous U-shaped orifice).

There has been described above a modification of the steel slag granulating system of my parent applications which avoids certain difficulties and provides certain improvements and advantages as discussed above.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A method of handling molten steel slag comprising: pouring molten steel slag into a receptacle; injecting a jet stream of water into said receptacle in the form of a moving trough of water having a generally horizontal bottom portion and a pair of generally vertical side portions extending upward from said bottom portion to intercept molten steel slag flowing into said receptacle, said vertical portions intercepting portions of said molten slag stream having a trajectory in a direction transverse to the longitudinal trajectory of said moving water trough, with the main portion of said molten slag stream having no such transverse trajectory intercepting and being granulated by said horizontal bottom portion of said water trough; said horizontal portion being injected with a jet velocity of at least about 25.0 f.p.s. and at least about 400 g.p.m. for a molten slag input rate of up to about 2 tons per minute, said horizontal portion being injected with a jet velocity of at least about 30–36 f.p.s. and at least about 500–60 g.p.m. for a molten slag rate of about 2 to about 4 tons per minute, said horizontal portion being injected with a jet velocity of at least about 36.5–55 f.p.s. and at least about 1200–1800 g.p.m. for a slag input rate of 4 to about 7 tons per minute, and said horizontal portion being injected with a jet velocity of at least about 55–61 f.p.s. and at least about 1800–2000 g.p.m. for a slag input rate of 7 to 8 tons per minute; maintaining water accumulating in said receptacle at a level below said moving trough of water while said molten steel slag is being poured into the receptacle so that the molten steel slag intercepts said trough of water above water accumulating in the receptacle; and removing resultant granulated slag particles from said receptacle while the granulation of the molten steel slag is in progress.

2. A method of handling molten steel slag according to claim 1, further including the step of injecting a second generally horizontal jet stream of water into said granulator below the horizontal bottom portion of said moving trough of water, the total quantity of water being injected by said first and second jet streams being at least about 400 gallons of water per minute per ton of molten steel slag granulated per minute.

3. A method of handling molten steel slag as defined in claim 2 wherein between about 60%–70% of the total quantity of water provided to said granulator is approximately equally divided between the horizontal portion of said first jet stream and said second jet stream, with the remainder of said water being equally divided between the vertical portions of said first jet stream.

4. A method of handling molten slag comprising: pouring said molten slag into a receptacle; injecting a jet stream of water into said receptacle to intercept said molten slag and to granulate said slag into particles, said jet stream being injected to define a moving trough of water having a bottom portion extending horizontally in a direction transverse to the flow direction thereof to intercept said molten slag, and having two generally vertical side portions extending upwardly from said bottom portion to intercept molten slag flowing into said receptacle with velocity components transverse to the longitudinal flow of said jet stream; maintaining water accumulating in said receptacle at a level below said water jet stream at all times while molten slag is being poured into said receptacle so that said slag intercepts said trough of water above said water accumulated in said receptacle; and removing resultant granulated slag particles from said receptacle while granulation is in progress at a rate sufficiently approximating the rate at which molten slag is poured into said receptacle to prevent substantial buildup of granulated slag particles within said receptacle.

5. A method of handling molten slag as described in claim 4 wherein said jet stream is injected into said receptacle with a first substantially horizontal jet portion entering said receptacle at a level below said molten slag and with second and third substantially vertical jet portions at the sides of and at right angles to said first jet portion.

6. A method of handling molten slag as defined in claim 4 wherein said jet stream is injected with a first jet portion having a generally rectangular, horizontally elongated cross section, and second and third jet portions also having rectangular cross sections with the longer dimensions thereof extending at right angles to the longer dimension of said first jet portion, said first jet portion being injected at a level intermediate the upper and lower ends of said second and third jet portions whereby said trough of water is characterized by an H-shaped cross section.

7. A method of handling molten slag as defined in claim 4 including the step of injecting a further generally horizontal jet stream of water into said granulator below the horizontal bottom portion of said moving trough of water.

8. A method for handling molten steel slag including the steps set forth in claim 7 wherein the total quantity of water injected into said granulator is at least about 400 gallons per minute per ton of slag granulated per minute, with at least about 60%–70% of said water being approximately equally divided between the horizontal bottom portion of said water trough and said further horizontal jet stream, and with the remainder of said water being approximately equally divided between the vertical side portions of said water trough.

9. A method of handling molten steel slag including the steps set forth in claim 4 wherein the bottom portion of said water trough is injected with a jet velocity of at least about 25.0 f.p.s. and at least about 400 g.p.m. for a molten slag input rate of up to about 2 tons per minute, with a jet velocity of at least about 30–36.5 f.p.s. and at least about 500–600 g.p.m. for a molten slag input rate of about 2 to about 4 tons per minute, when a jet velocity of at least about 73–110 f.p.s. and at least about 1200–1800 g.p.m. for a slag input rate of 4 to about 7 tons per minute, and with a jet velocity of at least about 110–122 f.p.s. and at least about 1800–2000 g.p.m. for a slag input rate of 7 to 8 tons per minute.

10. A method of handling molten steel slag as defined in claim 9 wherein the total quantity of water injected is at least about 400 gallons of water per minute per ton of molten slag granulated per minute, with the excess beyond that required to be injected through the bottom portion of said water trough according to claim 9 being provided through the vertical side portions of said water trough.

11. A method of handling molten steel slag as defined in claim 10 further including the step of injecting a second generally horizontally jet stream of water below said water trough with between about 60%–70% of the total quantity of water provided to said granulator being approximately equally divided between the horizontal portion of said water trough and said second jet stream, and with the remainder of said water being equally divided between the vertical portions of said water trough.

12. A method of handling molten steel slag from a steel making furnace comprising: pouring molten steel slag into a receptacle; injecting a jet stream of water into said receptacle to intercept said molten steel slag to granulate said slag into particles, said jet stream comprising a first generally horizontal portion and two generally vertical portions extending upwardly from said horizontal portion to define a moving trough of water of generally U-shaped cross section; with said vertical portions intercepting parts of said molten slag stream having a trajectory in a direction transverse to the longitudinal trajectory of said water jet streams, and with the main part of said molten slag stream having no such transverse trajectory intercepting and being granulated by said horizontal bottom portion of said trough of water, the total quantity of water being injected at a rate of at least about 400 gallons per minute per ton of molten slag input per minute with a velocity in the horizontal portion of said jet stream ranging from at least about 25 f.p.s. for a slag input rate of up to 2 tons per minute to at least about 55–61 f.p.s. for a slag input rate up to about 8 tons per minute; maintaining the water accumulating in said receptacle at a level below said water jet stream at all times while molten steel slag is being poured into said receptacle so that the molten slag intercepts said jet stream above the water accumulated in said receptacle; and removing the resultant granulated slag particles from said receptacle while granulation of molten steel slag is in progress.

13. A method of handling molten steel slag as defined in claim 12 including the step of injecting a further generally horizontal jet stream of water into said granulator below the horizontal bottom portion of said first jet stream, the total quantity of water being injected by said first and second jet streams being at least about 400 gallons of water per minute per ton of molten steel slag granulated per minute.

14. A method of handling molten steel slag as defined in claim 13 wherein between about 60%–70% of the total quantity of water provided to said granulator is approximately equally divided between the horizontal portion of said first jet stream and said second jet stream, with the remainder of said water being equally divided between the vertical portions of said first jet stream.

15. Molten slag granulating apparatus comprising: a receptacle; means for pouring a stream of molten slag into said receptacle; means for injecting a water jet stream into said receptacle with a trajectory intercepting the path of said molten slag and in sufficient quantity of granulate said slag into particles; means for maintaining a water bath accumulated in said receptacle at a level below said water jet stream while molten slag is being poured into the granulator rectptacle; said water injecting means comprising nozzle means for producing a trough-like water jet, said nozzle means having a generally horizontal bottom portion and two generally vertical side portions, each of said portions providing a stream of water having at least a predetermined velocity and rate of flow; said vertical water streams intercepting parts of said molten slag stream having a trajectory in a direction transverse to the longitudinal trajectory of said water jet streams; the main part of said molten slag stream having no such transverse trajectory intercepting and being granulated by said horizontal water stream.

16. Slag granulating apparatus as described in claim 15 wherein the horizontal bottom portion of said nozzle means is of sufficient transverse dimension to extend beyond the side edges of the stream of molten slag, and wherein said nozzle vertical side portions are disposed at the sides of said bottom nozzle portion, said vertical portions extending to a level about that at which said stream of slag intercepts said horizontal water stream.

17. Molten slag granulating apapratus as described in claim 15 wherein said nozzle means has a generally U-shaped cross section.

18. Molten slag granulating apparatus as described in claim 17 wherein said nozzle means horizontal bottom portion is disposed intermediate the upper and lower edges of said nozzle means vertical side portions, thus defining an H-shaped cross section for said water jet.

19. Molten slag granulating apparatus as described in claim 15 wherein said means for injecting said trough-like water jet comprises: first, second, and third jet nozzles each having a thin, elongated discharge orifice; said first nozzle being horizontally positioned to produce a substantially horizontal water jet entering said receptacle below and intercepting the stream of molten slag; said second and third nozzles being positioned adjacent the sides of said first nozzle with lower portions of said second and third nozzles at or below said first nozzle, thereby to produce substantially vertical water jets entering said receptacle laterally of said horizontal jet stream adjacent the outer edges thereof and with the lower edges of said vertical streams at or below the level of said horizontal jet stream.

20. Slag granulating apparatus as defined in claim 15 wherein said nozzle means comprises a composite nozzle having first, second, and third relatively narrow rectangular orifices, said first orifice extending a substantially greater distance in the horizontal direction than in the vertical direction, said second and said third generally rectangular orifices each positioned adjacent the sides of said first rectangular orifice and extending a substantially greater distance in the vertical direction than in the horizontal direction, thereby producing a trough-like water jet having a generally horizontal bottom portion and two generally vertical side portions.

21. Slag granulating apparatus as defined in claim 15 wherein said water injecting means comprises: a first nozzle having a horizontally elongated discharge orifice; second and third laterally spaced nozzles each having a generally rectangular vertically extending discharge orifice, said second and third nozzles being disposed adjacent the sides of said first nozzle, the bottom edges of the discharge orifices of said second and third nozzles being disposed at or below the level of the discharge orifice of said first nozzle to produce a trough-like water jet with said first nozzle; and a fourth nozzle vertically spaced below said first nozzle, said fourth nozzle having a horizontally elongated discharge orifice to produce a generally flat horizontal water jet below said trough-like water jet.

22. Slag granulating apparatus as defined in claim 21 wherein said first nozzle is so disposed that the discharge orifice thereof lies intermediate the upper and lower ends of the discharge orifices of said second and third nozzles, thus producing a trough of water which is of substantially H-shaped cross section transverse to the direction of water flow.

References Cited
UNITED STATES PATENTS

| | | | |
|---|---|---|---|
| 2,136,988 | 11/1938 | White | 65—141 |
| 3,316,075 | 4/1967 | Grady | 65—19 |

S. LEON BASHORE, Primary Examiner

E. R. FREEDMAN, Assistant Examiner

U.S. Cl. X.R.

65—141, 159, 160

PO-1050
(5/69)

UNITED STATES PATENT OFFICE
CERTIFICATE OF CORRECTION

Patent No. 3,531,269    Dated    September 29, 1970

Inventor(s)    JOHN J. GRADY

It is certified that error appears in the above-identified patent and that said Letters Patent are hereby corrected as shown below:

Column 3, line 21, after "velocity" insert -- components --. Column 4, line 54, "nivention" should read -- invention --; line 58, "elevaiton" should read -- elevation --. Column 5, lines 58 and 59, "nozzles" should read -- nozzle --; line 66, "comprises" should read -- comprised. Column 7, line 3, "ases" should read -- cases --. Column 8, line 64, "nozzle" should read -- nozzles --. Column 10, line 3, before "3/8 inch" insert -- about --; line 43, "30 - 36" should read -- 30 - 36.5 --; line 44, "500 - 60" should read -- 500 - 600 --. Column 11, line 75, "horizontally" should read -- horizontal --. Column 12, line 53, "of" should read -- to --. Column 13, line 1, "about" should read -- above --.

SIGNED AND
SEALED
MAR 16 1971

(SEAL)
Attest:

Edward M. Fletcher, Jr.
Attesting Officer

WILLIAM E. SCHUYLER, JR.
Commissioner of Patents